(12) United States Patent
Kambayashi et al.

(10) Patent No.: US 6,992,721 B1
(45) Date of Patent: Jan. 31, 2006

(54) IMAGE PICKUP DEVICE ATTACHABLE TO ELECTRONIC APPARATUS

(75) Inventors: Ko Kambayashi, Santa Clara, CA (US); Takashi Hirasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 895 days.

(21) Appl. No.: 09/594,513

(22) Filed: Jun. 16, 2000

(30) Foreign Application Priority Data

Aug. 31, 1999 (JP) .................................. 11-246287

(51) Int. Cl.
  *H04N 5/225* (2006.01)
(52) U.S. Cl. .................... 348/373; 348/207.1; 348/552
(58) Field of Classification Search ........... 348/207.99, 348/207.1, 207.11, 211.99, 211.11, 211.12, 348/373, 374, 375, 552, 231.6; 361/683
  See application file for complete search history.

(56) References Cited

U.S. PATENT DOCUMENTS

| | | | | | |
|---|---|---|---|---|---|
| 5,475,441 | A | * | 12/1995 | Parulski et al. | 348/552 |
| 5,801,919 | A | * | 9/1998 | Griencewic | 361/683 |
| 6,005,613 | A | * | 12/1999 | Endsley et al. | 348/231.6 |
| 6,118,485 | A | * | 9/2000 | Hinoue et al. | 348/373 |
| 6,323,902 | B1 | * | 11/2001 | Ishikawa | 348/373 |
| 6,587,151 | B1 | * | 7/2003 | Cipolla et al. | 348/373 |

FOREIGN PATENT DOCUMENTS

| | | |
|---|---|---|
| JP | 3011657 | 3/1995 |
| JP | 7-322117 | 12/1995 |
| JP | 8-9215 | 1/1996 |
| JP | 8-98076 | 4/1996 |
| JP | 9-128091 | 5/1997 |
| JP | 09-139877 | * 5/1997 |
| JP | 3044340 | 10/1997 |
| JP | 10-51665 | 2/1998 |
| JP | 10-12666 | 5/1998 |
| JP | 10-271376 | 10/1998 |
| JP | 10-301718 | 11/1998 |
| JP | 11-53060 | 2/1999 |

OTHER PUBLICATIONS

Toshiba Libretto ff 1100 Brochure; Issued by Toshiba Corporation, Jun. 1999.
Panasonic Let's note/C33EA Brochure, Issued by Matsushita Electric Industrial Co., Ltd., Jun. 1999.
Sony VAIO PCCG-C!S Brochure, Issued by Sony Corporation, May 1999.
Victor Mobile PC InterLink MP-C101, Press Release, By Victor Company of Japan, Limited, Jun. 1999.

* cited by examiner

*Primary Examiner*—Tuan Ho
(74) *Attorney, Agent, or Firm*—Westerman, Hattori, Daniels & Adrian, LLP

(57) ABSTRACT

The present invention aims at providing a function-expansion unit for an electronic apparatus that may reduce the stress onto a connector, and provides a high stability with a CCD camera. The CCD camera includes a reinforcing member under its connecting portion and a height-adjustable stand, thereby reducing the stress that would otherwise apply to the USB connector as the connecting portion, enhancing the connection, preventing connector's deterioration in the course of time, and allowing the CCD camera to be stably placed.

10 Claims, 16 Drawing Sheets

IMAGE PICKUP DEVICE ATTACHABLE TO ELECTRONIC APPARATUS

BACKGROUND OF THE INVENTION

The present invention relates generally to peripheral equipment for use with a notebook personal computer ("notebook PC") or portable terminal, a portable electronic apparatus, a personal digital assistant ("PDA"), and other electronic apparatuses, and more particularly to an image pickup device connectible with the electronic apparatus or hardware. The "peripheral equipment", as used herein, is such hardware as is connectible with a PC body and realizes necessary functions.

The recent development and spread of notebook PCs, portable terminals and portable electronic apparatuses have increasingly demanded compact and lightweight notebook PCs for portability purposes which nevertheless exhibit such affluent functions on a desk in an office as desktop personal computers ("desktop PCs"). As part of an attempt to achieve such multi-functionality, a device for adding an image pickup function to the notebook PC has been proposed.

Japanese Laid-Open Patent Application No. 9-128091 discloses a notebook computer that has an image pickup device connectible to a PC card with a cable. However, an image pickup portion including an image-pickup lens is still too large for portability. Japanese Laid-Open Patent Application No. 10-271376 has proposed a CCD camera built-in notebook PC that has improved the portability by mounting the entire CCD camera onto the PC card. Japanese Patent Applications Laid-Open Nos. 8-9215 (or U.S. Pat. No. 5,867,218) and 7-322117 (or European Patent Application, Publication No. 683,596) also disclose techniques of building a CCD camera in a card-shaped housing.

Japanese Utility-Model Registration No. 3011657 discloses an electronic camera that may be detachably stored in a concave portion provided on a desktop PC body and connected via a connector with the PC body in the concave portion.

A technique of mounting a CCD camera in a hinge portion connecting a liquid display bezel frame and base section of the notebook PC is known in the art as seen in products such as Toshiba's Libretto ff 1100, Panasonic's Let's note/C33EA, Sony's VAIO PCCGC1s.

Attachment techniques of a CCD camera or other USB-compatible units through a USB port instead of a PC card are known in the art as well. For example, Japanese Laid-Open Patent Application No. 11-53060 discloses a notebook PC equipped with a CCD-camera USB port at a top of its display section so that the camera is connectible directly or via cable to the USB port. The USB port is compatible with a printer or keyboard in addition to the CCD camera. As recently as Jun. 21, 1999, Victor Company of Japan, Limited announced a release of a CCD camera (USB capture camera 'MP-UC1') that can be mounted on a notebook PC (mobile PC 'InterLink' MP-C101).

The present inventors have focused attention on a USB-compatible image pickup device having several advantages including plug-and-play and hot plug capabilities. The CCD camera as seen in Victor's MP-UC1 may be likely to be broken by concentrated load of its own weight on a connector portion with the notebook PC when the notebook PC with the CCD camera is lifted. In this respect, conventional configurations for the CCD camera are not sufficient so as to prevent the connector portion such as a USB port from breaking while ensuring its connectivity with universal notebook PCs.

BRIEF SUMMARY OF THE INVENTION

Therefore, it is an exemplified general object of the present invention to provide a novel and useful image pickup device attachable to an electronic apparatus in which the above disadvantages are eliminated.

Another exemplified and more specific object of the present invention is to provide an image pickup device attachable to an electronic apparatus that can prevent the connector portion from breaking while ensuring its connectivity with universal notebook PCs.

In order to achieve the above objects, an image pickup device as one exemplified, embodiment of the present invention comprises a connector which is connectible, e.g., electrically or optically, to an electronic apparatus, and a reinforcing portion which is located near the connector and reinforces the connector when the electronic apparatus and the connector connect with each other. The reinforcing portion in this image pickup device may reduce a load that would otherwise apply to the connector, and prevent connector's deterioration in the course of time.

The image pickup device may further comprise an anchor portion and a movable portion. The movable portion includes an image pickup portion, and the connector and the reinforcing portion may be placed on the anchor portion. The reinforcing portion can be stored in the anchor portion so that it can project from the anchor portion. Accordingly, the reinforcing portion may be stored in the anchor portion while the image pickup device is not attached to the electronic apparatus. The image pickup device may further comprise a stand that is connected with the anchor portion and serves to adjust a height of the anchor portion. Consequently, the height of the image pickup device can be varied according to a height of the electronic apparatus to which the image pickup device is attached, reducing a load applied that would otherwise apply to the connector when the electronic apparatus having the image pickup device is placed on its footprint. The stand may adjust an inclined angle of the anchor portion. Therefore, for example, even if the electronic apparatus is a notebook PC of which a keyboard tilts for ergonomic purposes, a position and orientation of the anchor portion of the image pickup device can be adjusted accordingly, whereby the load to the connector would be eliminated as well. The anchor portion may include a storage portion that can store the image pickup portion. This allows the image pickup device to protect the image pickup portion when unused.

The image pickup device as another exemplified embodiment of the present invention comprises a connector that is connectible, e.g., electrically or optically, to an electronic apparatus, and an attachment portion that enables the image pickup device to be attached to an external apparatus. This image pickup device may be attached to an external device (including electronic apparatus) through the attachment portion. Thus, the image pickup device attached to a desired position may capture a desired subject, and to remove or reduce an area for placement of the image pickup device. The image pickup device may include an anchor portion and a movable portion. The movable portion includes an image pickup portion, and the connector may be placed on the anchor portion. The attachment portion enables the anchor portion to be attached to the external apparatus. The attachment portion may be provided onto the anchor portion so that it can project from the anchor portion. Accordingly, the attachment portion may be attached to any position, for instance, the electronic apparatus may include a display portion, and the image pickup device may be attached onto the display portion through the attachment portion.

Other objects and further features of the present invention will become readily apparent from the following description of the preferred embodiments with reference to accompanying drawings.

DETAILED DESCRIPTION OF THE INVENTION

Figure 1:
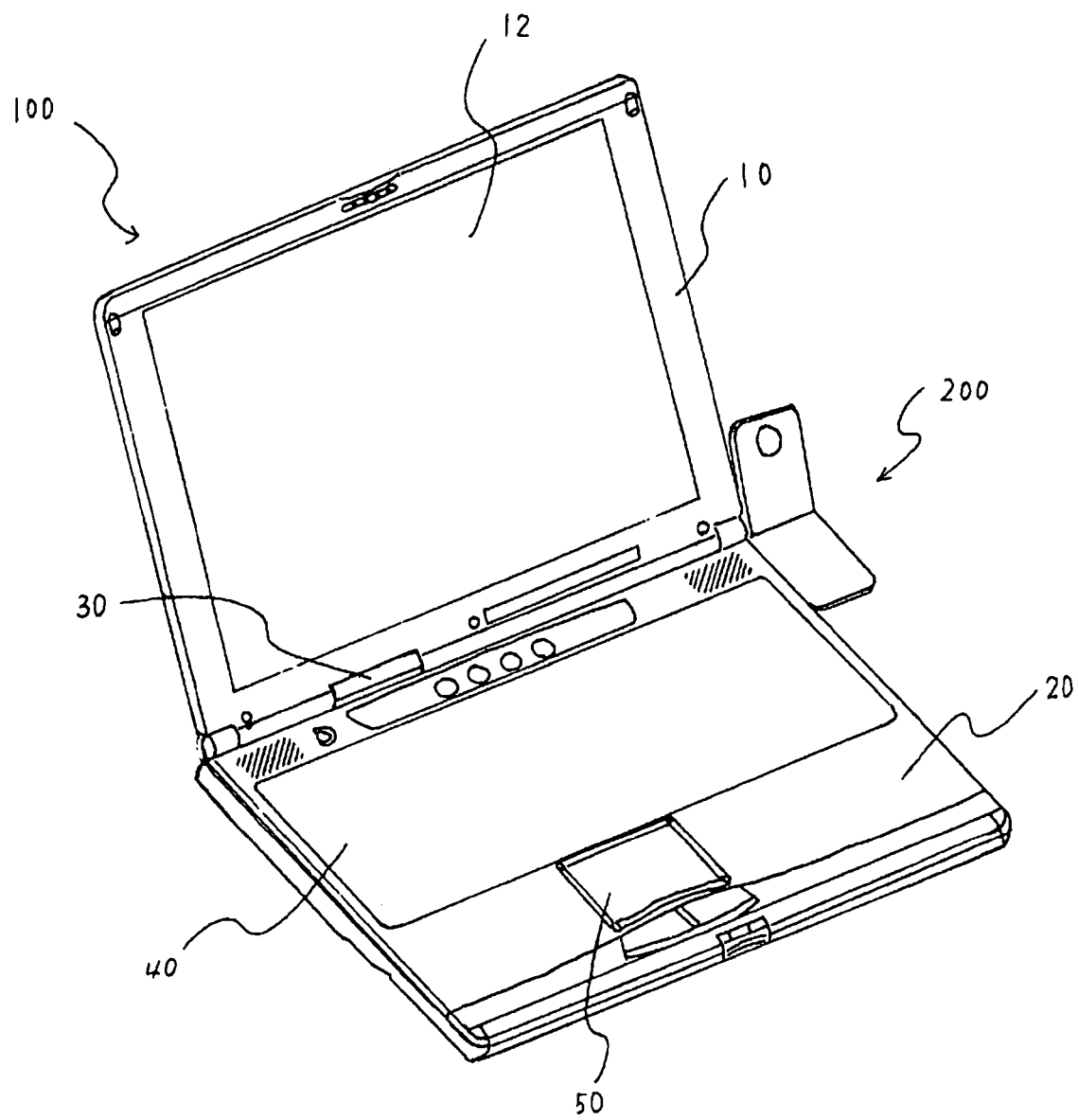
FIG. 1 is a schematic perspective view of one exemplified aspect of an inventive image pickup device connected to an electronic apparatus.

A description will now be given of an inventive image pickup device 100 connected to an electronic apparatus 100 with reference to FIG. 1. The same members are designated by the same reference numerals, and a duplicate description thereof will be omitted.

Referring to FIG. 1, an electronic apparatus 100 and the image pickup device 200 are exemplarily shown as, but not limited to, a notebook PC 100 and a CCD camera 200, respectively. The electronic apparatus 100 includes PDAs, handheld PCs, palm-size PCs, wearable computers, portable electronic apparatuses, and portable terminals. The image pickup device 200 includes, but not limited to, digital still cameras, digital movie cameras, disc cameras, digital video cameras, retina recognition devices, fingerprint recognition devices, and the like. The notebook PC 100 may cover A4, B5, sub-notebook, mini-notebook and other sizes. Hereupon, FIG. 1 is a schematic perspective view of the CCD camera 200 mounted on the notebook PC 100 while it is being used. The CCD camera 200 includes an anchor portion 210, a movable portion 220, a focus lens (image pickup portion) 230, a shutter 240, a USB connector 250, a reinforcing portion 260, and a stand 270. A further description will be given of its detailed structure with reference to magnified diagrams shown in FIGS. 2 and 3.

The notebook PC 100 includes a liquid crystal display (LCD) bezel frame 10 and a base 20 that are connected to each other via a hinge 30, and an LCD screen 12 is placed on the LCD bezel frame 10. Typically, the base 20 has a thickness of about 50 mm or less, or preferably about 20 to 30 mm. The LCD bezel frame 10 has a substantially rectangular shape so as to hold the LCD screen 12. As described above, a universal notebook PC may be used for the notebook PC 100 of the present embodiment. However, the image pickup device 200 of the present invention is also applicable, for example, to a notebook PC of a special specification that is equipped with a USB port at the top of the LCD bezel frame 10.

The base 20 includes a keyboard section 40 for typing information in, and the keyboard may use any type and arrangement. Usable types of the keyboard may include 101, 106, 109 and ergonomics, and usable key arrangements include QWERTY, DVORAK, JIS, new-JIS, and NICOLA (Nihongo Nyuryoku Conthotium Layout).

The base 20 includes an external frame 22 and an aperture 24 provided on the external frame 22, as will be described later with reference to FIG. 15. The base 20 also includes a pointing device 50 that emulates part of mouse functions. Despite the structure shown in FIG. 1, the pointing device 50 may include a mouse, a trackball, a trackpad, a tablet, a digitizer, a joystick, a joypad, a touch panel, and a stylus pen.

The base 20 is provided with a connecting portion (USB interface, not shown) connectible with the USB connector 250, and this interface and USB connector 250 serve to establish an electric connection between the CCD camera 200 and the notebook PC 100. Through this connecting portion, data is transmitted from the CCD camera 200 to the notebook PC 100. Similarly, control information is transmitted from the notebook PC 100 body to the CCD camera 200.

USB (Universal Serial Bus) is a serial interface for PC peripherals, serves to bring connecting cables together, and supports a plug and play or hot plug. It permits a multiplex connection up to 128 ports, and supports two kinds of transfer rates, 1.5 Mbps for a low-speed mode, and 12 Mbps for a high-speed mode. Four varieties of transfer modes (bulk, control, interrupt, and isochronous modes) are available. The isochronous mode is used for preferentially transferring at intervals data required for a real-time transfer such as a movie and sound. Its signal lines consist of four wires (two communication lines and two power lines). As described above, the USB is suitable for a low- or mid-speed communication interface (ranging from 1.5 Mbps to 12 Mbps), and thus preferably applied to capturing a movie of midrange quality in resolution and display speed (e.g., 320×240 pixels, and 5 or 6 frames/sec.), therefore serving as an inexpensive and standardized communication interface.

However, the connector of the image pickup device 200 of the present invention is not necessarily limited to the USB connector 250, and applicable interfaces exemplarily include, but are not limited to, a parallel interface (e.g., IEEE1284 and IEEE1394), a serial interface (e.g., RS-232C and RS-422), IDE (including Enhanced IDE and the like), SCSI (including SCSI-2, SCSI-3), Ultra ATA, ATAPI, 10BASE-2, 10BASE-T, 100BASE-TX, MIDI, ZV port, CardBus, and IrDA. It goes without saying that a cable or other members may be used for the connector, instead. It is preferable that an expansion unit such as the image pickup device 200 supports plug-and-play or hot plug capabilities so as to update the system immediately upon connecting to the notebook PC 100.

Figure 11:
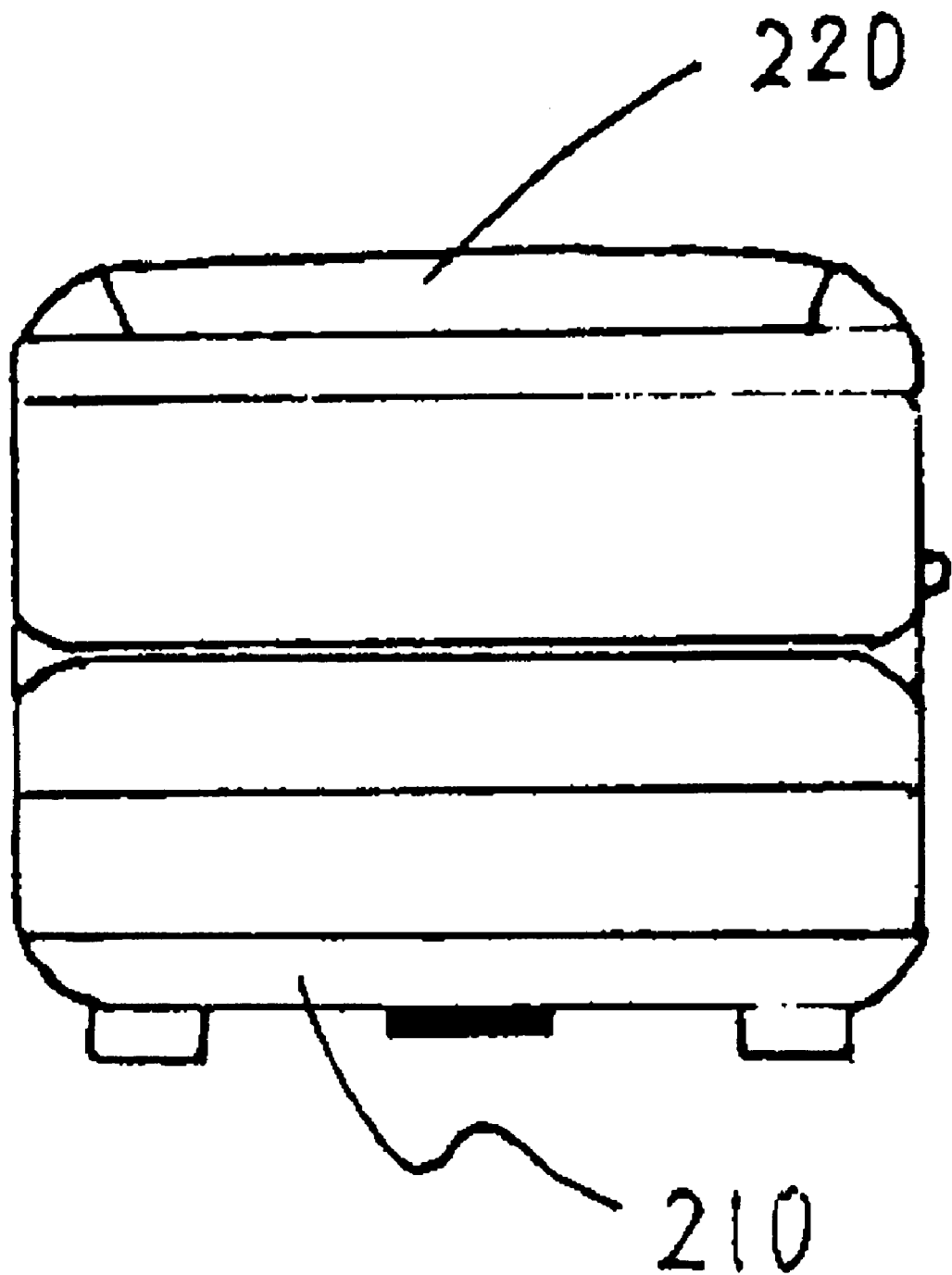
FIG. 11 is a front view of a CCD camera in which the movable portion is folded (closed) into its anchor portion.
Figure 12:
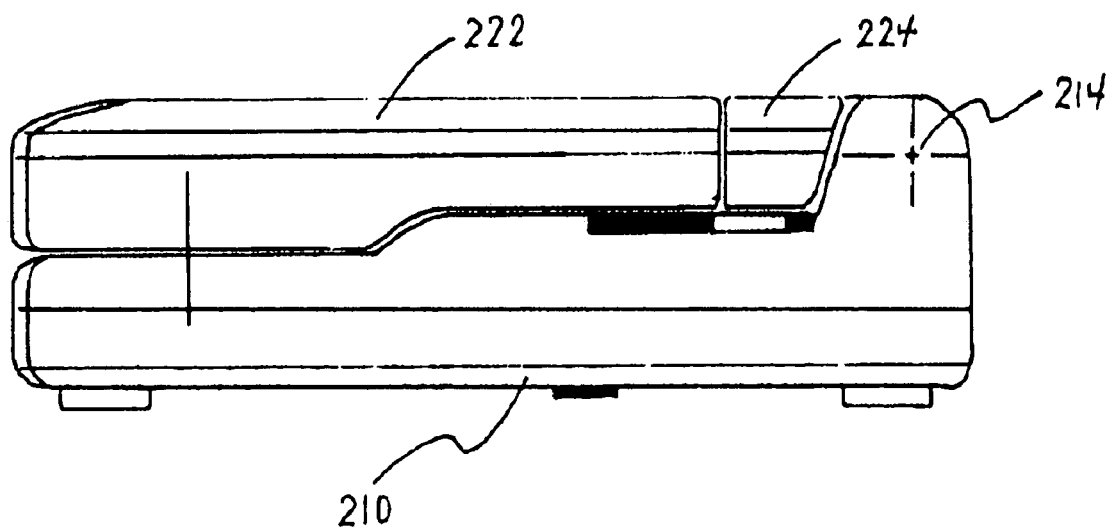
FIG. 12 is a right side view of a CCD camera in which the movable portion is folded (closed) into its anchor portion.
Figure 13:
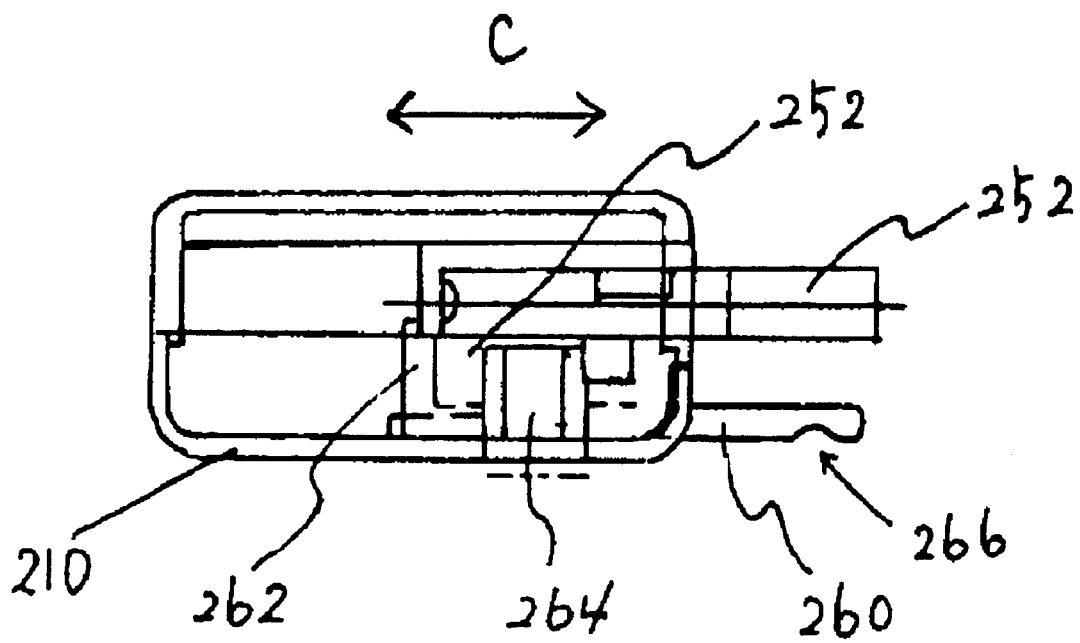
FIG. 13 is a sectional view of a CCD camera in which the USB connector and reinforcing portion project.
Figure 14:
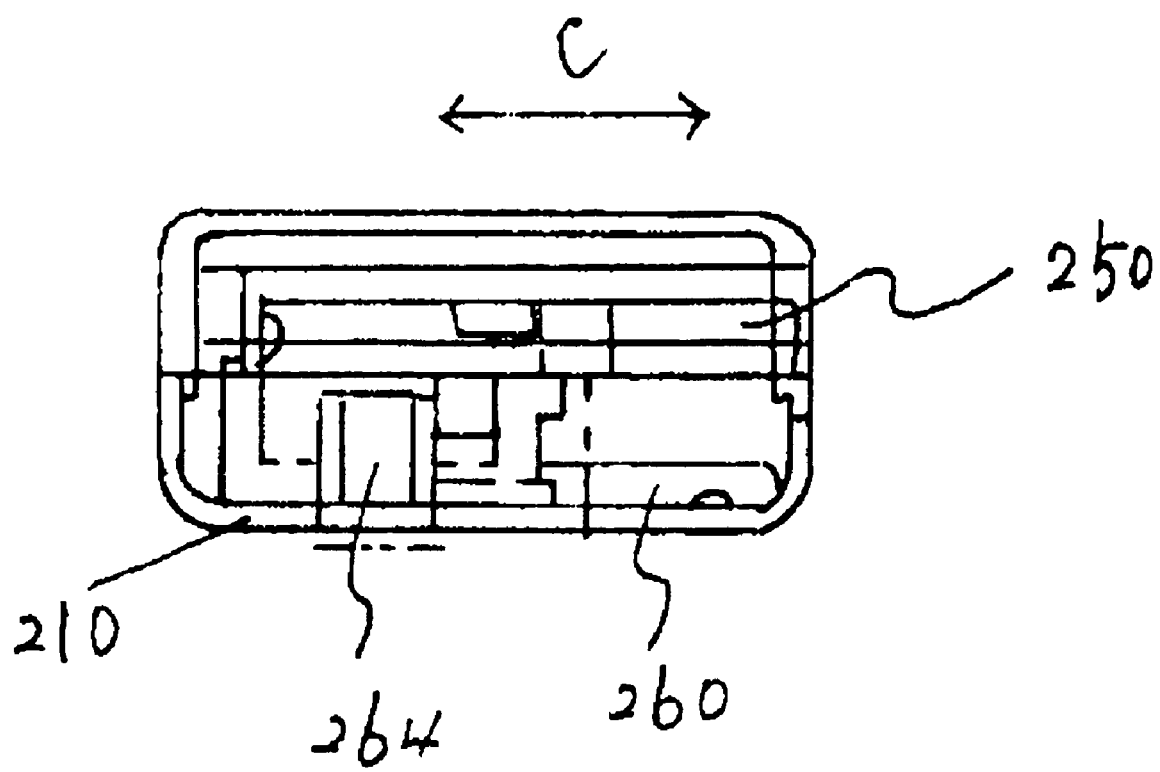
FIG. 14 is a sectional view of a CCD camera in which the USB connector and reinforcing portion are stored.

Referring now to FIGS. 2 through 16, a description will be given of a shape and structure of the CCD camera 200 as one exemplified embodiment of the present invention. FIGS. 2 through 5 are respectively a front view (FIG. 2), a right side view (FIG. 3), a left side view (FIG. 4), and a top view (FIG. 5) of the CCD camera 200 with its movable portion 220 raised (opened) from its anchor portion 210 for showing a state in which a USB connector 250 and a reinforcing portion 260 are stored in the anchor portion 210. FIGS. 6 through 10 are respectively a front view (FIG. 6), a right side view (FIG. 7), a left side view (FIG. 8), a top view (FIG. 9), and a rear view (FIG. 10) of the CCD camera 200 with its movable portion 220 raised from its anchor portion 210 for showing a state in which a USB connector 250 and a reinforcing portion 260 are projected from the anchor portion 210. FIGS. 11 and 12 are respectively a front view and a right side view of the CCD camera 200 with its movable portion 220 folded (closed) into its anchor portion 210. FIG. 13 is a sectional view of the CCD camera 200 showing a state in which a USB connector 250 and a reinforcing portion 260 are projected. FIG. 14 is a sectional view of the CCD camera showing a state in which a USB connector 250 and a reinforcing portion 260 are stored. FIG. 15 is a rear view of the notebook PC 100 to which the CCD camera 200 is attached. FIG. 16 is a right side view of the CCD camera 200 for explaining a stand 270 for the CCD camera 200.

As described above, the CCD camera 200 includes an anchor portion 210, a focus lens 230, a shutter 240, a USB connector 250, a reinforcing portion 260, and a stand 270.

The anchor portion 210 is attached through the USB connector 250 and the reinforcing portion 260 to the notebook PC 100 in such a manner as not to rotate. The anchor portion 210 includes a storage portion 212 of the focus lens 230 as shown in FIGS. 3, 4, 7 and 8. Accordingly, as best shown in FIG. 12, the focus lens 230 is stored in the storage portion 212 when the movable portion 220 is closed, and thus prevented from breaking when unused. In addition, the anchor portion 210 includes a pivot portion 214 constituting an axis of a pivoting movement of the movable portion 220 in a direction A, as will be discussed later.

Figure 2:
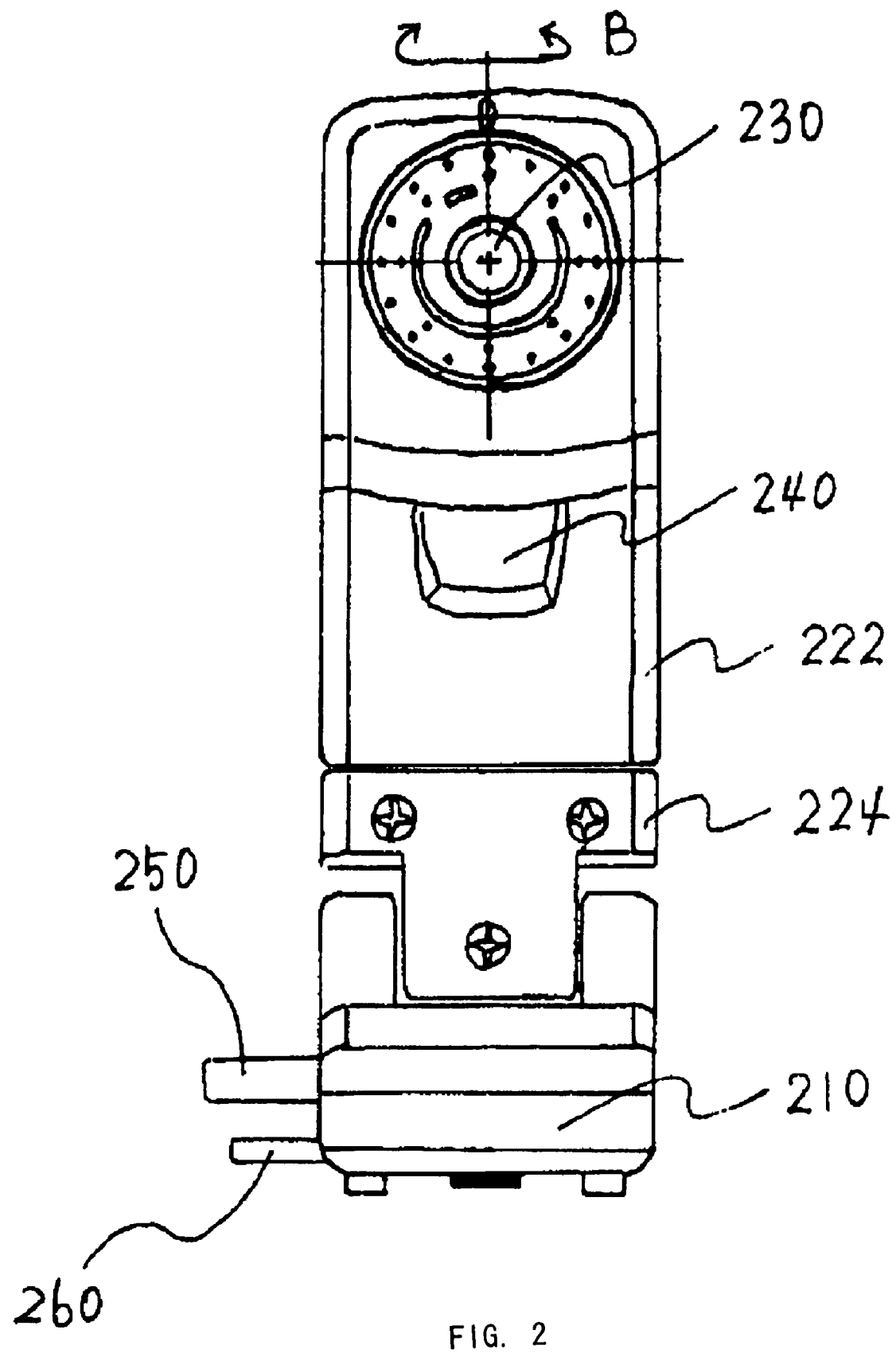
FIG. 2 is a front view of a CCD camera in which a movable portion is raised (opened) from an anchor portion when a USB connector and a reinforcing portion are stored in the anchor portion.
Figure 3:
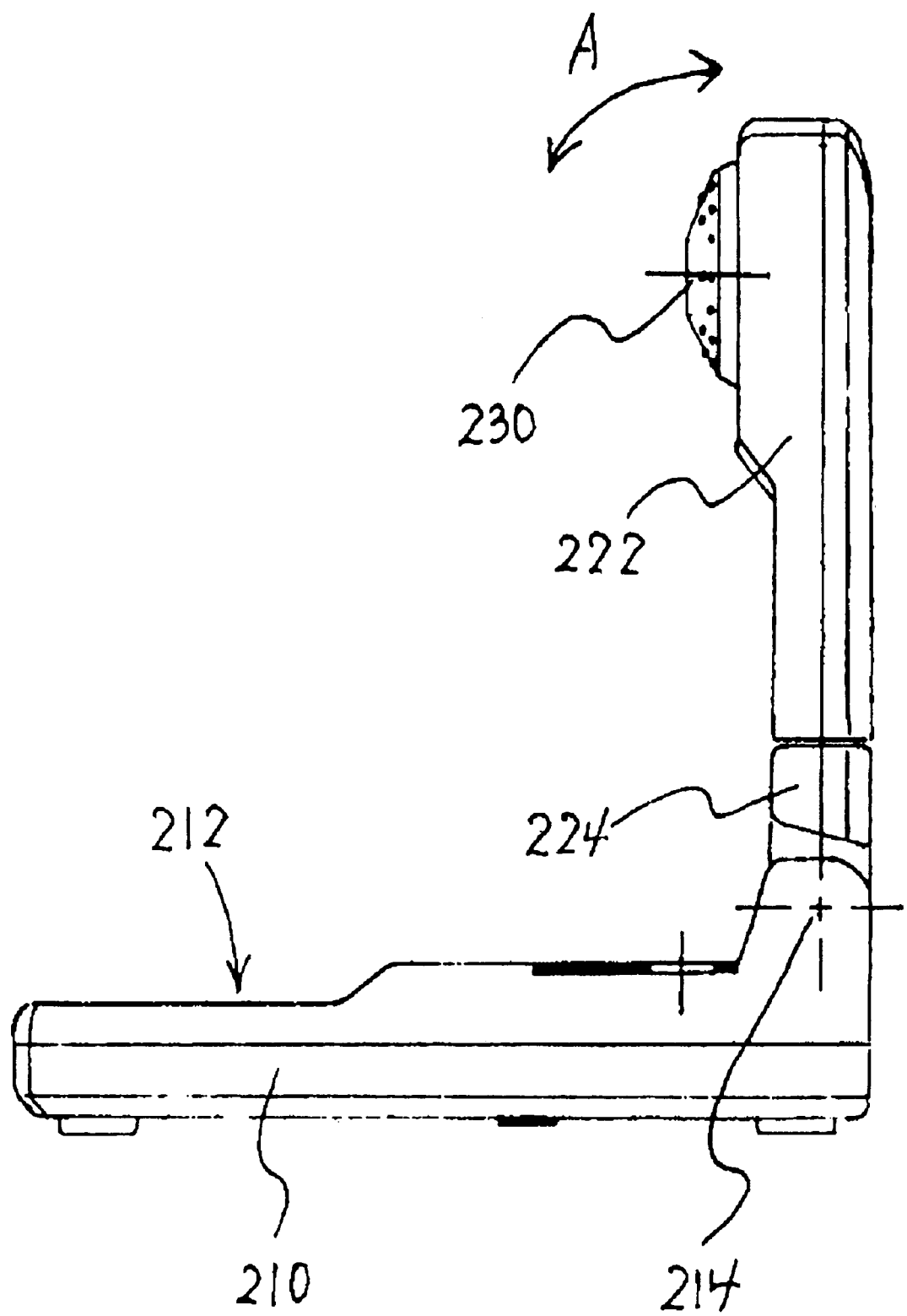
FIG. 3 is a right side view of a CCD camera in which the movable portion is raised (opened) from the anchor portion when the USB connector and reinforcing portion are stored in the anchor portion.
Figure 4:
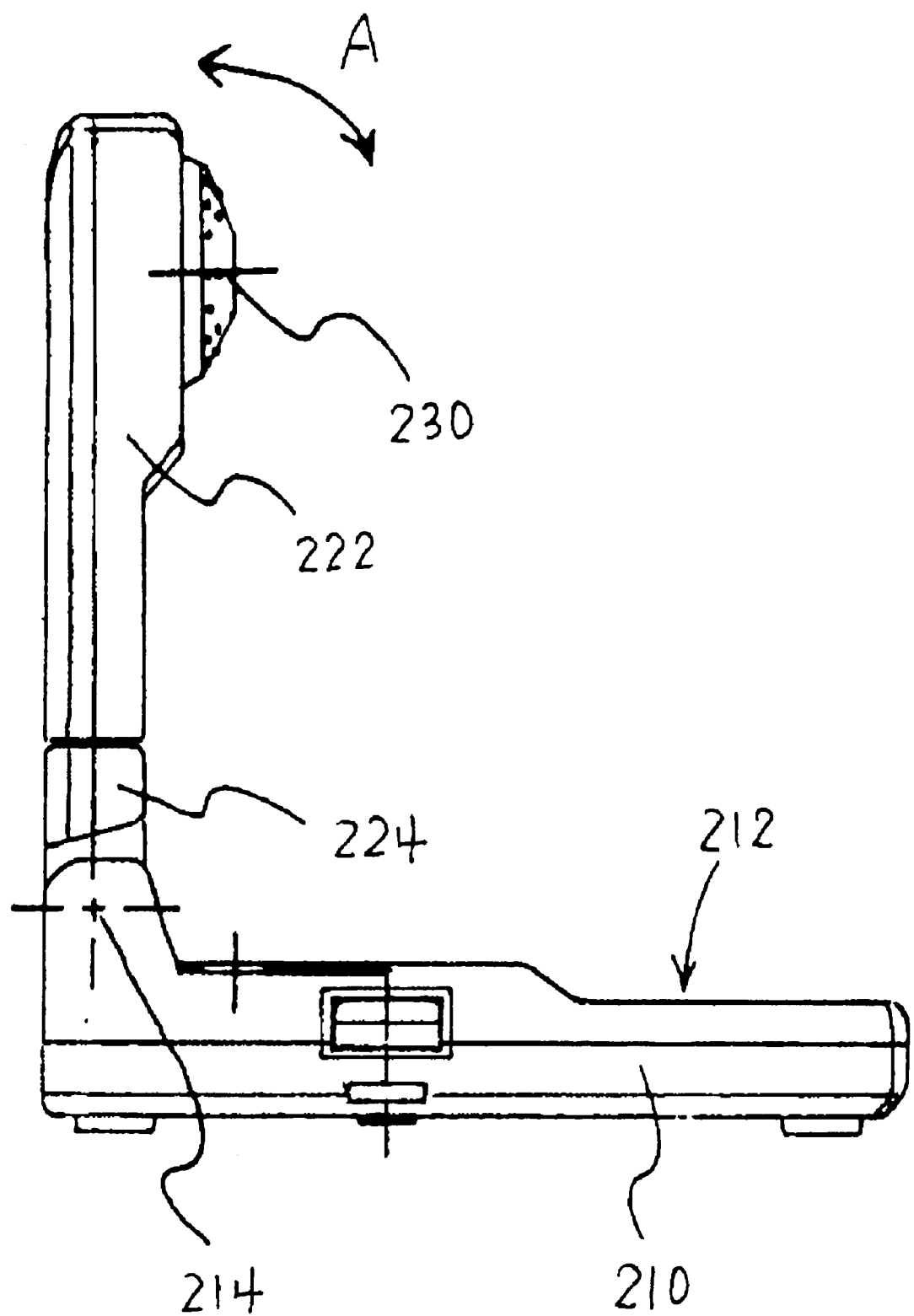
FIG. 4 is a left side view of a CCD camera in which the movable portion is raised (opened) from the anchor portion when the USB connector and reinforcing portion are stored in the anchor portion.
Figure 5:
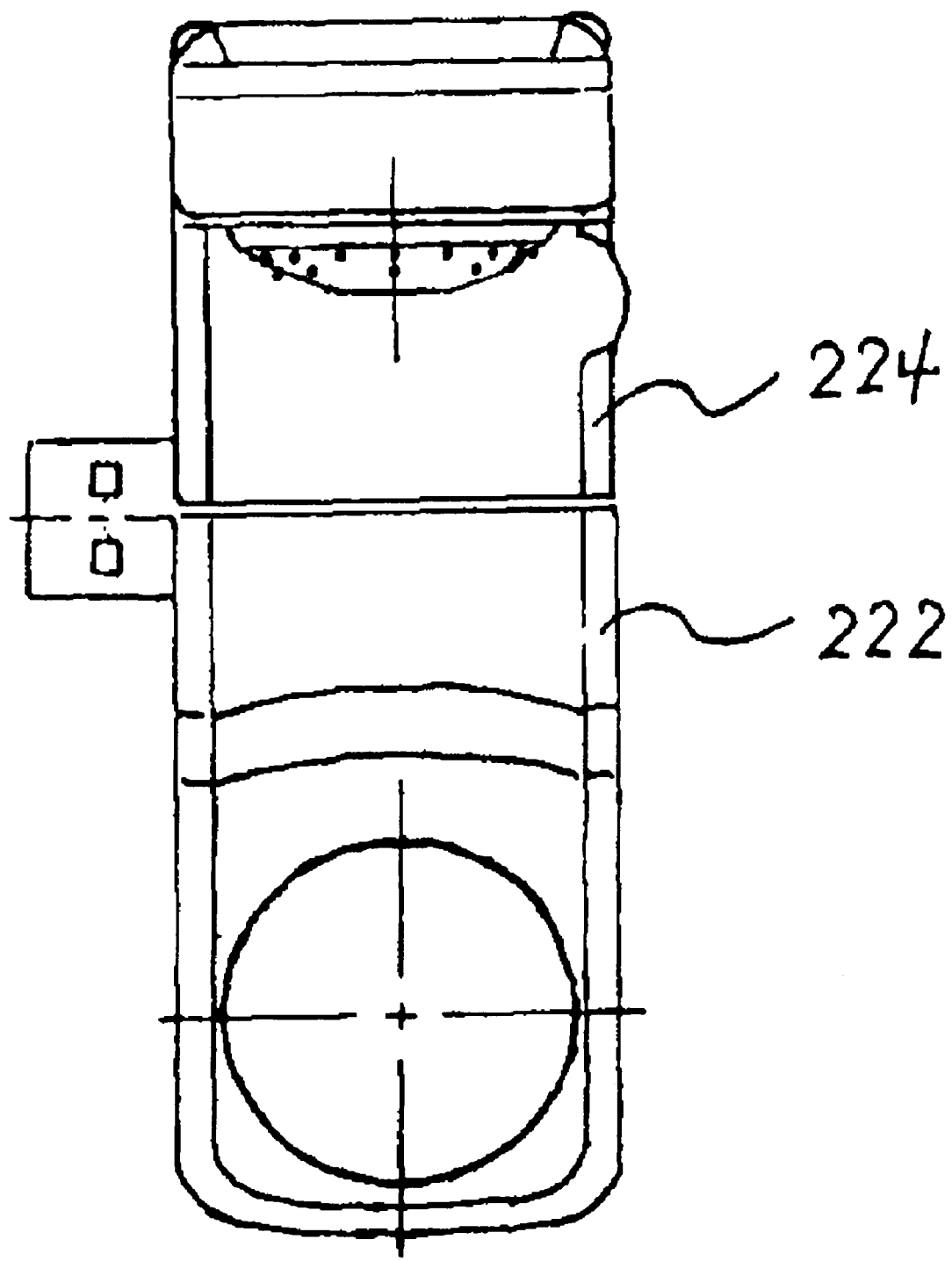
FIG. 5 is a top view of a CCD camera in which the movable portion is raised (opened) from the anchor portion when the USB connector and reinforcing portion are stored in the anchor portion.
Figure 6:
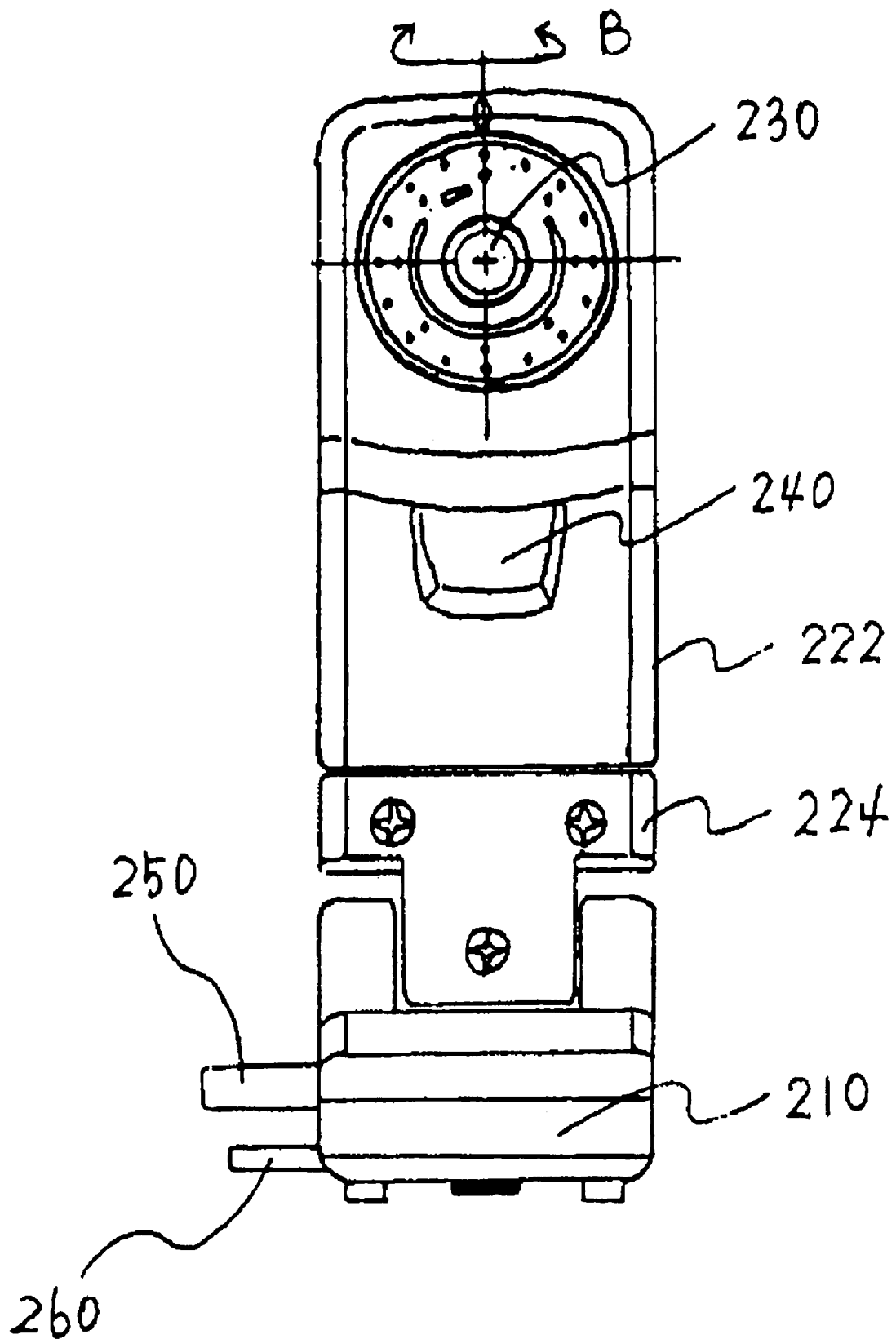
FIG. 6 is a front view of a CCD camera in which the movable portion is raised from the anchor portion when the USB connector and reinforcing portion project from the anchor portion.
Figure 7:
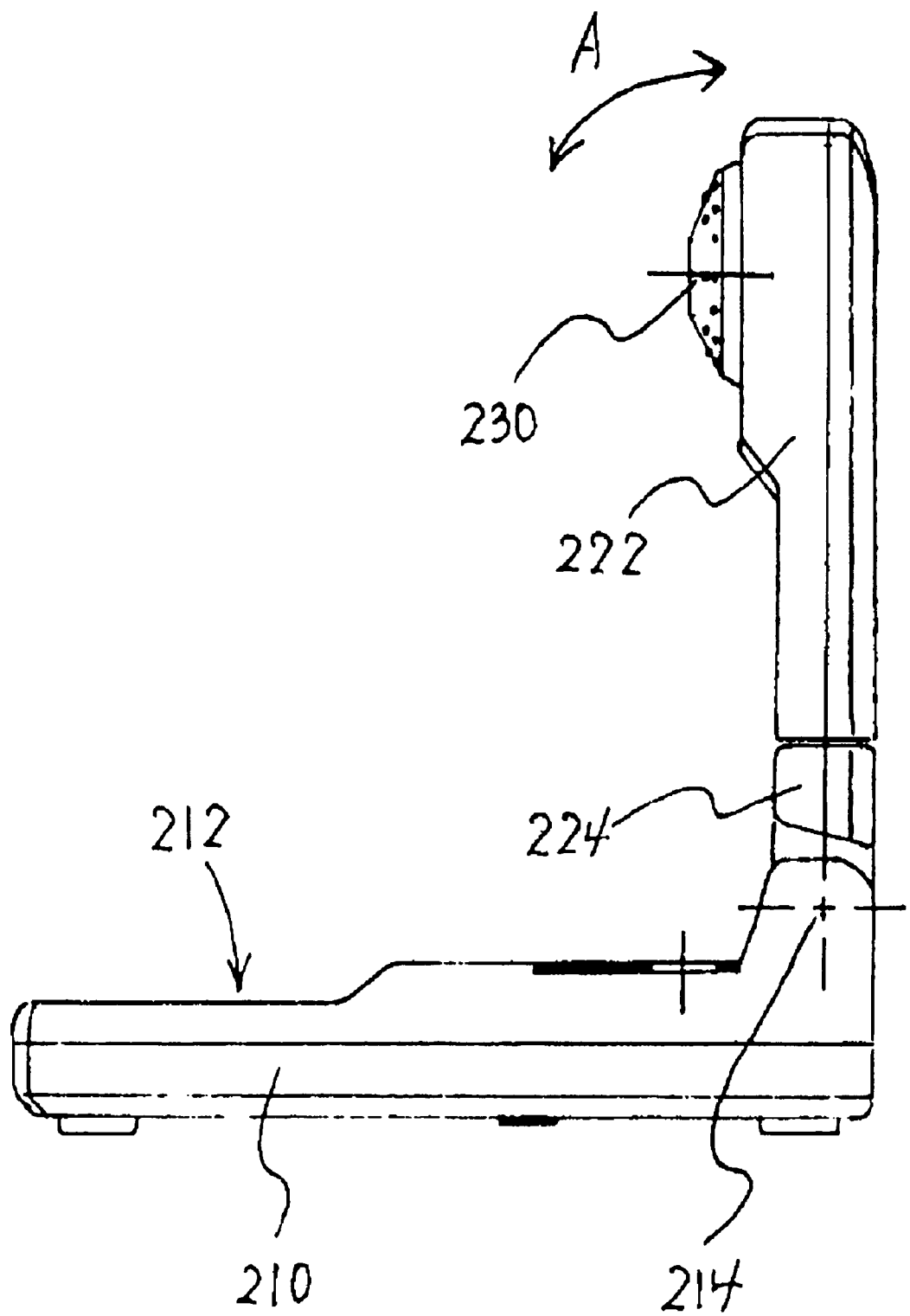
FIG. 7 is a right side view of a CCD camera in which the movable portion is raised from the anchor portion when the USB connector and reinforcing portion project from the anchor portion.
Figure 8:
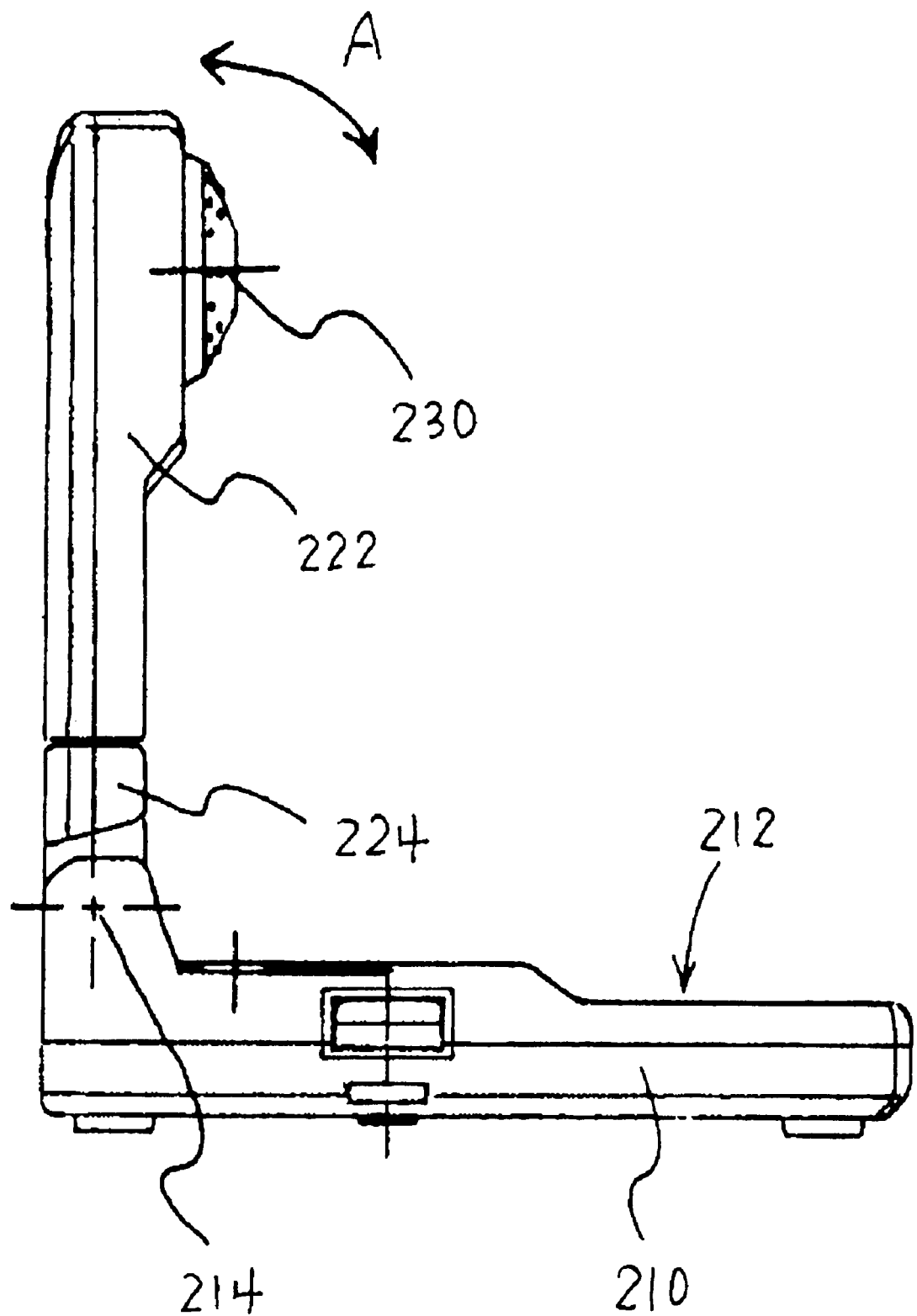
FIG. 8 is a left side view of a CCD camera in which the movable portion is raised from the anchor portion when the USB connector and reinforcing portion project from the anchor portion.
Figure 9:
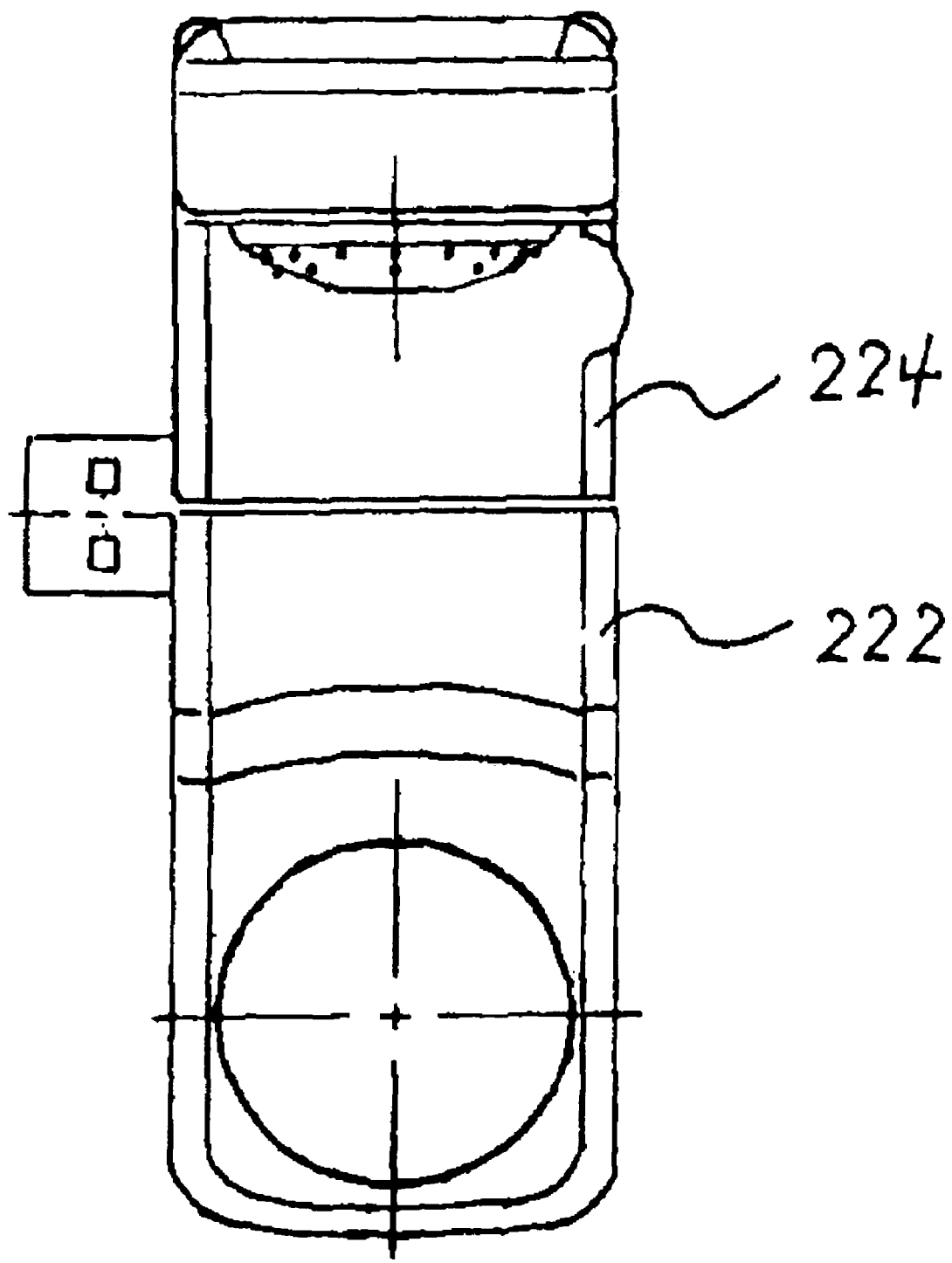
FIG. 9 is a top view of a CCD camera in which the movable portion is raised from its anchor portion when the USB connector and reinforcing portion project from the anchor portion.

The movable portion 220 includes first and second movable portions 222 and 224. The first movable portion 222 may pivot about a shaft (not shown) that pierces the first and second movable portions 222 and 224, in a direction B as shown in FIGS. 2 and 6, with respect to the second movable portion 224. The second movable portion 224 may pivot about a shaft (not shown) that pierces the pivot portion 214 and the second movable portion 224, in a direction A as shown in FIGS. 3, 4, 7 and 8, with respect to the anchor portion 210.

Figure 10:
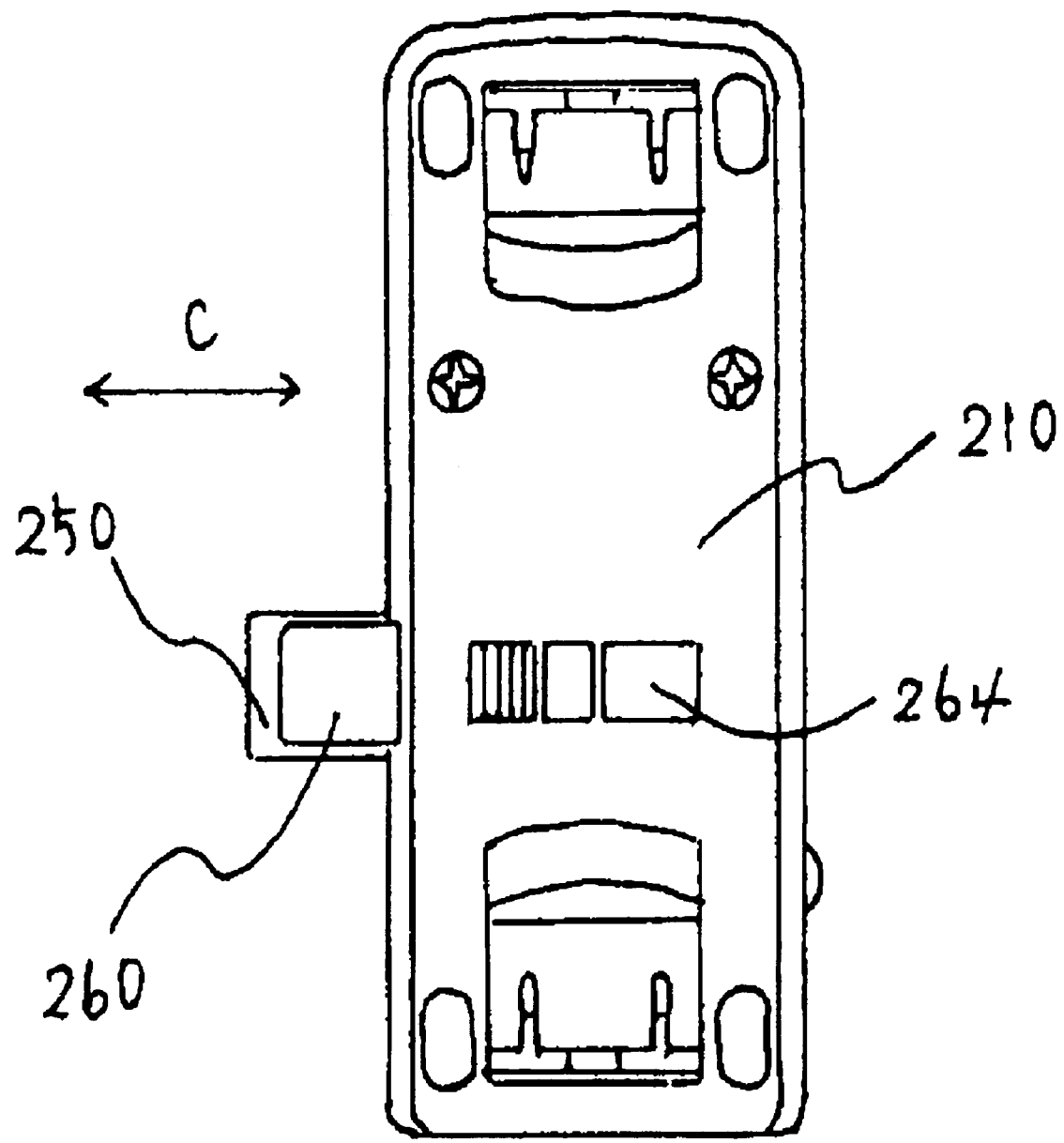
FIG. 10 is a rear view of a CCD camera in which the movable portion is raised from the anchor portion when USB connector and reinforcing portion project from the anchor portion.

The USB connector 250 and the reinforcing portion 260 are stored in the anchor portion 210 so that it can project out to the left as shown in FIGS. 2 through 10. Each member may project synchronously or separately. An exemplary projection mechanism for each member is shown in FIGS. 10, 13, and 14. In these drawings, the USB connector 250 and the reinforcing portion 260 are connected via members 252 and 262 to each other, and synchronously move between a projection position and a storage position by shifting a button 264 shown in FIGS. 10, 13, and 14 in a direction C.

In contrast to the present embodiment, the USB connector 250 and the reinforcing portion 260 may be provided on a right, front, or rear side, or other portions, and connected to the notebook PC 100 in a position opposite to that in the present embodiment. In addition, the USB connector 250 and/or the reinforcing portion 260 to be provided may come more than one in number as necessary.

Since any structures known in the art may be applied to the focus lens 230, the shutter 240, and its other necessary imaging structures, a detailed explanation will now be omitted. An image captured through the lens 230 are transmitted by way of the USB connector 250 and a connector portion (not shown) in the notebook PC 100 to a information processing portion in the notebook PC 100. Also, this image is displayed on the LCD screen 12. Consequently, a user may edit the image using image-editing software as known in the art.

The reinforcing portion 260 serves to prevent the connector 250 from breaking by application of moment of a force by the CCD camera 200 based on its own weight. As shown in FIG. 6, the reinforcing portion 260 is placed under the connector 250. As specifically illustrated in FIG. 13, the reinforcing portion 260 includes a cutaway portion 266 which mates with a part of the external frame 22 of the base 22 in the notebook PC 100 shown in FIG. 15. In other words, the notebook PC 100 includes an aperture 24 through which the reinforcing portion 260 is inserted into the base 20. The external frame 22 near the aperture 24 can be wrought into a desired shape.

The stand 270 serves to adjust the height of the CCD camera 200, and as necessary, to partially tilt its orientation. Its height adjustment capability can accommodate variations of the height among the kinds of the notebook PC 100 to be connected. Its tilt adjustment capability can tilt the anchor portion 210 of the CCD camera 200 so as to be brought into alignment with the keyboard 40 of the notebook PC 100 to be connected that would be tilted toward a user (so as to raise its rear side having the LCD screen 12) for ergonomic purposes (i.e., for convenience in typing). Such a tilt adjustment mechanism of the stand 270 may adjust the CCD camera 200 itself so as to be kept in a horizontal position even if a footprint P where the CCD camera is placed is tilted. For example, in FIG. 16, the footprint P where the CCD camera 200 is placed descends to the right, but the stand 270 serves to maintain lateral balance with its height adjustment mechanism and/or tilt adjustment mechanism, keeping the camera 200 in a horizontal position. From the foregoing it will be seen that the stand 270 may align the heights of the CCD camera 200 and the notebook PC 100 to which the CCD camera 200 is connected, even if the heights vary between them relative to a footprint P, and may keep the CCD camera in a horizontal position even if the footprint P is tilted, thereby reducing a stress arising in the connector 250.

Figure 15:
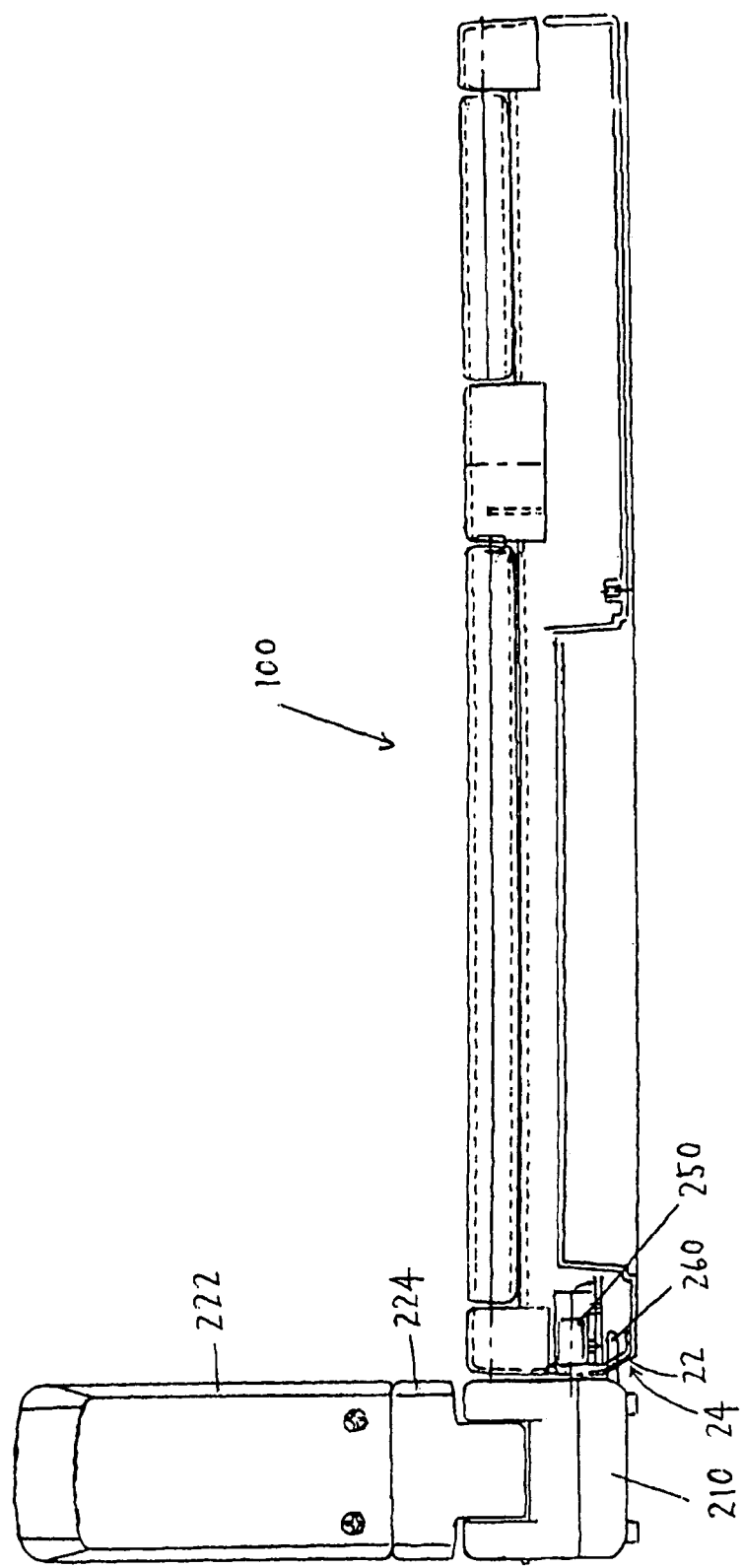
FIG. 15 is a rear view of a notebook PC to which a CCD camera is attached.
Figure 16:
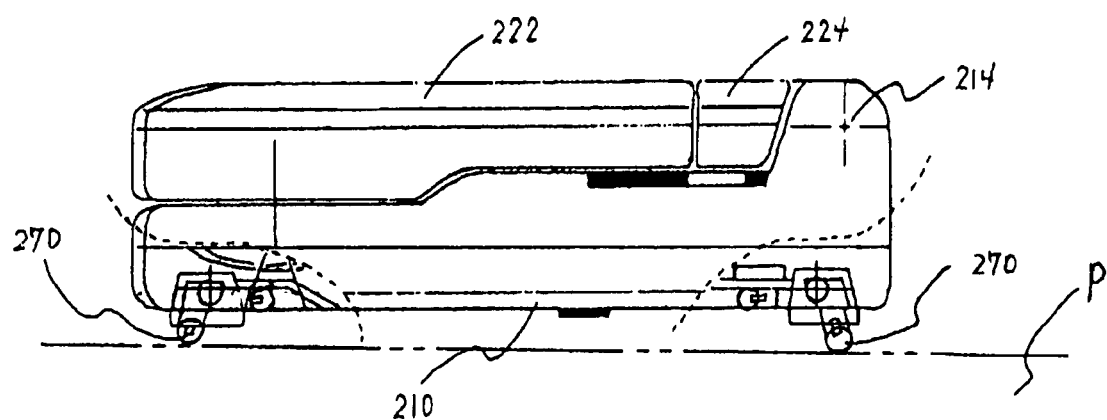
FIG. 16 is a right side view of a CCD camera for explaining a stand for the CCD camera.

FIG. 15 shows a state in which the USB connector 250 and the reinforcing portion 260 are connected to the notebook PC 100, and their heights are adjusted by the stand 270. It will be understood that the height adjustment capability that the stand 270 has makes the connector 250 and the reinforcing portion 260 connected to the notebook PC 100 in a horizontal position. This may reduce the stress arising in the connector 250, and avoid deteriorating the connector 250.

Figure 17:
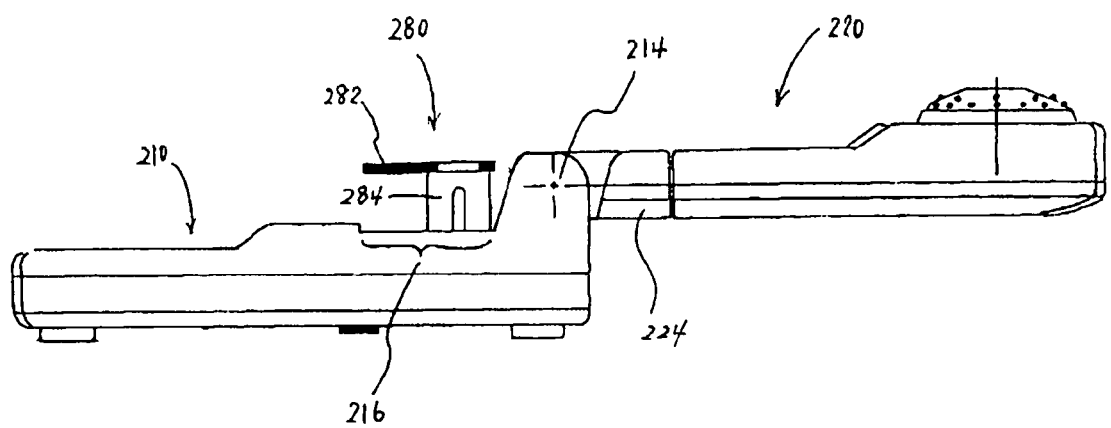
FIG. 17 is a right side view of a CCD camera in which the movable portion tilted by approximately 180 degrees relative to the anchor portion when the attachment portion projects from its anchor portion.
Figure 18:
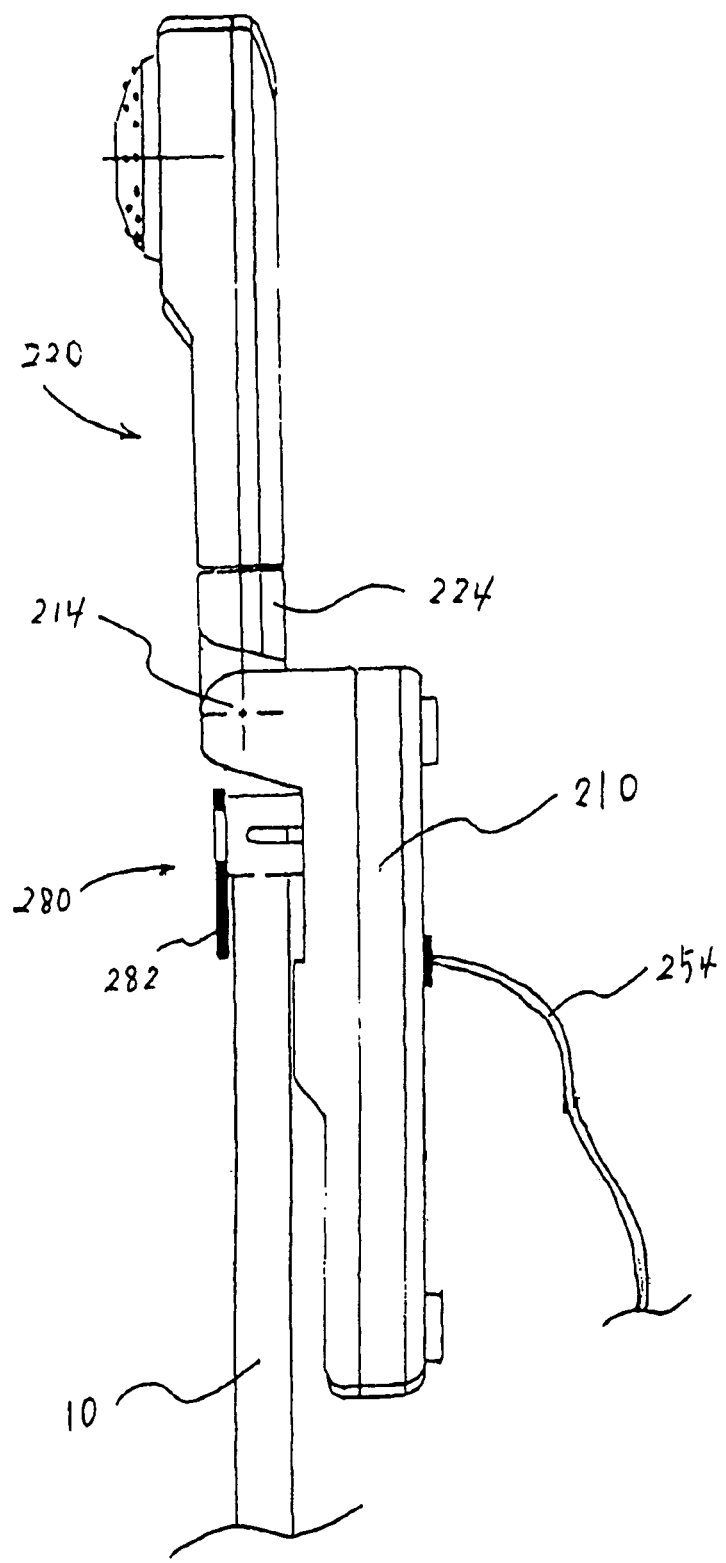
FIG. 18 is a right side view of the CCD camera shown in FIG. 17 attached to an LCD bezel frame of a notebook PC.

A description will be given of another exemplary configuration of the CCD camera 220 connected to the notebook PC 100, with reference to FIGS. 17 and 18. FIG. 17 is a right side view of the CCD camera 200 with its movable portion 220 tilted approximately 180 degrees relative to its anchor portion 210 for showing a state in which its attachment portion 280 is projected from the anchor portion 210. FIG. 18 is a right side view showing a state in which the CCD camera 200 shown in FIG. 17 is attached to an LCD bezel frame 10 of a notebook PC 100.

The attachment portion 280 is provided on the anchor portion 210 of the CCD camera 200. The attachment portion 280 includes a holding plate 282 that can be stored in an area 216 of the anchor portion 210, a column 284 that includes the holding plate 282 at its end and can be projected from the anchor portion 210. The attachment portion 280 may also include, as necessary, a mechanism for locking the attachment portion 280 in the state as shown in FIG. 17. Similarly, the movable portion 220 may also include a mechanism for locking the movable portion 220 into the anchor portion 210 in the state as shown in FIG. 17.

The attachment portion 280 may be engaged with the notebook PC 100 by projecting the column 284 from the anchor portion 210 and inserting a top portion of the LCD bezel frame 10 between the holding plate 282 and the anchor portion 210. At that time, the notebook PC 100 and the CCD camera 200 may be connected, for instance, via a USB cable 254. The USB cable 254 may be directly connected to the notebook PC 100. The CCD camera 100 as shown in FIGS. 2 through 16 may either include the USB cable 254, or not. The CCD camera 200 may be used at a height different from a conventional configuration by mounting the CCD camera 200 on the LCD bezel frame 10. In addition, the CCD camera 200 is allowed to ensure its shooting range as far as the cable 254 can extend.

Instead of the cable 254, the notebook PC 100 may use a wireless communication means such as an infrared data communication protocol to communicate with the anchor portion 210. Among infrared data communication protocols, IrDA known in the art may be utilized, as a great number of the notebook PCs may be equipped with an IrDA port. The IrDA port may be provided at any place on the body of the notebook PC 100. In that event, information captured through the CCD camera 200 is transmitted directly to the notebook PC 100.

It is to be noted that the illustrated shape of the attachment portion 280 is exemplary only. Accordingly, if necessary, the attachment portion 280 may be configured to be replaceable with other structural member. Further, any shape attachable to at least other apparatus except for itself (image pickup device) may be enough for the attachment portion 280 of the present invention, and the apparatuses to which the image pickup device 200 can be attached are not restricted to the electronic apparatus 100 to which the image pickup device 200 is electrically or optically connected (e.g., portable information processor, and notebook PC), but may be other apparatuses. Such other apparatuses may not necessarily be electronic apparatuses such as a desk, a partition, and other office automation appliances. Moreover, a tripod, a bookshelf, a bookend, and the like may be included in the above other apparatuses, and the present invention covers the image pickup device 200 attachable to such apparatuses.

Although certain preferred embodiments of the present invention have been described above, various changes and modifications may be made in the present invention without departing from the spirit and scope thereof.

As described above, the image pickup device of the present invention due to its inclusion of a reinforcing portion would reduce a stress arising in the connector when it connects to the main body of the notebook PC, etc., and prevent the connector from deteriorating, while keeping the main body compact by allowing the reinforcing portion to be stored and projected. Furthermore, the image pickup device of the present invention is attachable to any external device including the liquid crystal display (LCD) of the notebook PC, and thus can change its height and position.

What is claimed is:

1. An image pickup device comprising:
   a connector that is connectible with an electronic apparatus, said connector being directly provided on the image pickup device without an external cable; and
   a reinforcing portion that is located near said connector and reinforces said connector when said electronic apparatus and said connector connect with each other, said connector and reinforcing portion being independent and separate members,
   wherein said reinforcing portion reduces a moment force applied to said connector, which moment force is caused by a weight of the image pickup device.

2. An image pickup device according to claim 1 further comprising an anchor portion and a movable portion, said moveable portion including an image pickup portion, and said connector and said reinforcing portion being placed on said anchor portion.

3. An image pickup device according to claim 1, wherein said connector includes a USB interface.

4. An image pickup device comprising:
   a connector that is connectible with an electronic apparatus, said connector being directly provided on the image pickup device without an external cable;
   a reinforcing portion that is located near said connector and reinforces said connector when said electronic apparatus and said connector connect with each other; and
   an anchor portion and a movable portion, said moveable portion including an image pickup portion, and said connector and said reinforcing portion being placed on said anchor portion,
   wherein said reinforcing portion is stored in said anchor portion so that said reinforcing portion can project from said anchor portion.

5. An image pickup device comprising:
   a connector that is connectible with an electronic apparatus, said connector being directly provided on the image pickup device without an external cable;
   a reinforcing portion that is located near said connector and reinforces said connector when said electronic apparatus and said connector connect with each other;

an anchor portion and a movable portion, said moveable portion including an image pickup portion, and said connector and said reinforcing portion being placed on said anchor portion; and a stand that is connected with said anchor portion and serves to adjust a height of said anchor portion.

6. An image pickup device comprising:

a connector that is connectible with an electronic apparatus, said connector being directly provided on the image pickup device without an external cable;

a reinforcing portion that is located near said connector and reinforces said connector when said electronic apparatus and said connector connect with each other;

an anchor portion and a movable portion, said moveable portion including an image pickup portion, and said connector and said reinforcing portion being placed on said anchor portion; and a stand that is connected with said anchor portion and serves to adjust a height of said anchor portion, wherein said stand also serves to adjust a tilt of said anchor portion.

7. An image pickup device comprising:

a connector that is connectible with an electronic apparatus, said connector being directly provided on the image pickup device without an external cable;

a reinforcing portion that is located near said connector and reinforces said connector when said electronic apparatus and said connector connect with each other; and an anchor portion and a movable portion, said moveable portion including an image pickup portion, and said connector and said reinforcing portion being placed on said anchor portion, wherein said anchor portion includes a storage portion that can store said image pickup portion.

8. An image pickup device comprising:

a connector that is connectible with an electronic apparatus;

an attachment portion that enables said image pickup device to be attached to an external apparatus; and an anchor portion and a movable portion, said movable portion including an image pickup portion, said connector being placed on said anchor portion, and said attachment portion enabling said anchor portion to be attached to the external apparatus, wherein said attachment portion can be provided onto said anchor portion so that attachment portion can project from said anchor portion.

9. An image pickup device according to claim 8, wherein said electronic apparatus includes a display portion, and said attachment portion is attachable to said display portion.

10. An image pickup device according to claim 8, wherein said connector includes a USB interface.

* * * * *

UNITED STATES PATENT AND TRADEMARK OFFICE
CERTIFICATE OF CORRECTION

PATENT NO. : 6,992,721 B1
APPLICATION NO. : 09/594513
DATED : June 16, 2000
INVENTOR(S) : Ko Kambayashi et al.

It is certified that error appears in the above-identified patent and that said Letters Patent is hereby corrected as shown below:

On the Title page, Item (73): Assignee,

Please add the second assignee information which should read

--FUJITSU GENERAL LIMITED, Kawasaki (JP)--.

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

PATENT NO.         : 6,992,721 B1                                          Page 1 of 1
APPLICATION NO. : 09/594513
DATED              : January 31, 2006
INVENTOR(S)        : Ko Kambayashi et al.

It is certified that error appears in the above-identified patent and that said Letters Patent is hereby corrected as shown below:

On the Title page, Item (73): Assignee,

Please add the second assignee information which should read

--FUJITSU GENERAL LIMITED, Kawasaki (JP)--.

This certificate supersedes Certificate of Correction issued April 10, 2007.

Signed and Sealed this

Eighth Day of May, 2007

JON W. DUDAS
*Director of the United States Patent and Trademark Office*